United States Patent [19]

See et al.

[11] Patent Number: 4,958,000

[45] Date of Patent: Sep. 18, 1990

[54] PROCESS FOR PREPARING POLYARYLATES

[75] Inventors: Benito See, Belle Mead; Ulrich A. Steiner, North Plainfield, both of N.J.

[73] Assignee: Amoco Corporation, Chicago, Ill.

[21] Appl. No.: 354,827

[22] Filed: May 22, 1989

[51] Int. Cl.$^5$ .................. C08G 63/00; C08G 67/00; C08G 69/00

[52] U.S. Cl. ........................... 528/271; 528/176

[58] Field of Search .................. 528/176, 271

[56] References Cited

U.S. PATENT DOCUMENTS

| | | | |
|---|---|---|---|
| 4,281,099 | 7/1981 | Maresca | 528/176 |
| 4,294,956 | 10/1981 | Berger et al. | 528/176 |
| 4,294,957 | 10/1981 | Berger et al. | 528/179 |
| 4,296,232 | 10/1981 | Maresca et al. | 528/176 |
| 4,321,355 | 3/1982 | Maresca et al. | 528/176 |
| 4,374,239 | 2/1983 | Berger et al. | 528/176 |
| 4,485,230 | 11/1984 | Yu | 528/176 |
| 4,612,360 | 9/1986 | Ort | 528/176 |

Primary Examiner—Harold D. Anderson
Assistant Examiner—T. Mosley
Attorney, Agent, or Firm—Janice M. McLain; William H. Magidson; Ralph C. Medhurst

[57] ABSTRACT

Described herein is a process for preparing a polyarylate having a reduced viscosity of from about 0.5 to greater than 1.0 dl/gm which process comprises the following steps:

(a) reacting an acid anhydride derived from an aliphatic monocarboxylic acid containing from 2 to 8 carbon atoms with at least one dihydric phenol to form the corresponding diester;

(b) after forming the diester, removing by vacuum distillation the bulk of the residual acid anhydride, then adding acetic acid, then vacuum distilling to bring the anhydride concentration to a level low enough to enable the formation of a polymer having a low color and good thermal stability; and (c) reacting said diester with at least one aromatic dicarboxylic acid at a temperature sufficient to form the polyarylate.

18 Claims, No Drawings

PROCESS FOR PREPARING POLYARYLATES

BACKGROUND OF THE INVENTION

This invention is directed to an improved process for preparing polyarylates which are melt stable and low in color. Most polyarylates range in color from straw to amber. Modern Plastics Encyclopedia, 1989. As is shown in the literature, it is difficult in commercial production to achieve low color polyarylates. The reason for the difficulty and the solution is fully discussed infra.

Polyarylates are polyesters derived from a dihydric phenol and an aromatic dicarboxylic acid, particularly mixtures of terephthalic and isophthalic acids. These polyarylates are high temperature, high performance thermoplastic polymers with a good combination of thermal and mechanical properties. They also have good processability which allows them to be molded into a variety of articles.

Many processes have been described in the literature for the preparation of polyarylates. One such process is the diacetate process. In the diacetate process, a dihydric phenol is converted to its diester derivative, which is then reacted with an aromatic dicarboxylic acid(s), to form the polyarylate.

U.S. Pat. No. 4,075,173 issued Feb. 21, 1978, describes the preparation of copolyesters by reacting an aromatic dicarboxylic acid, a diacetate of Bisphenol-A, and an acetate of p-hydroxybenzoic acid. Various processes for producing polyarylates by the reaction of Bis-phenol-A and terephthalic and isophthalic acids are reviewed in this patent. The following process for producing polyarylates, identified as route (1), is described in column 2, of the patent:

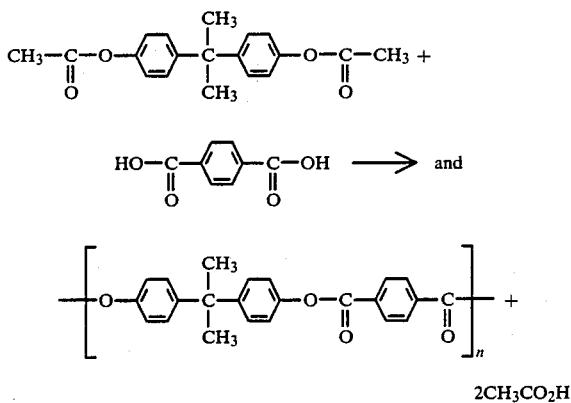

This process is the diacetate process as described herein, or the "Acetate Process" as defined in the patent.

Column 2 of the patent states:

"The route (1) is not desirable because the undesirable coloration and deterioration of polymer are particularly remarkable as disclosed in the above-mentioned literature."

Further, column 3 of the patent states:

"On the other hand, the route (1), Acetate process, is economically advantageous because the materials used are cheap and the operation is simple. For example, diacetate of bisphenol-A, a monomer for Acetate process, is synthesized by merely reacting acetic anhydride and bisphenol-A. Consequently, it may be said that, if the fatal drawbacks of Acetate process, color and deterioration, are solved, Acetate process will become the most superior process."

Thus, the skilled workers in the field of polyarylate chemistry realize that the existing processes for producing polyarylates have one or more deficiencies, and that a need exists to develop a viable diacetate process for producing polyarylates.

In the following U.S. Patents, novel methods for producing polyarylates by the diacetate process are described.

U.S. Pat. No. 4,294,956, filed Aug. 27, 1979 in the name of M. H. Berger, et al. and titled "Process For Preparing Polyarylates in the Presence of a Diphenyl Ether" describes a process for preparing polyarylates having a reduced viscosity of from about 0.5 to greater than 1.0 dl/gm, the process comprises reacting at least one diester derivative of a dihydric phenol with at least one aromatic dicarboxylic acid in the presence of a diphenyl ether compound, at a temperature of from about 260° to about 350° C.

U.S. Pat. No. 4,294,957, filed Aug. 27, 1979 in the name of M. H. Berger, et al. and titled "Process For Preparing Polyarylates" describes a process for preparing polyarylates of improved color which process comprises reacting a diester derivative of a dihydric phenol with an aromatic dicarboxylic acid in the presence of at least one cycloaliphatic, substituted aromatic or heteroaromatic compound, which compounds contain at least one benzylic and/or tertiary hydrogen atom, at a temperature of from about 260° to about 350° C. Optionally, the process may be carried out in the presence of a magnesium, manganese, or zinc catalyst.

U.S. Pat. No. 4,296,232, filed Aug. 27, 1979 in the name of L. M. Maresca, et al. and titled "Process For Preparing Polyarylates in the Presence of a Diphenyl Ether Compound and A Catalyst" describes a process for preparing polyarylates which process comprises reacting a diester derivative of a dihydric phenol with an aromatic dicarboxylic acid in the presence of a diphenyl ether compound at a temperature of from about 260° to about 350° C. and in the presence of a magnesium catalyst.

However, in the U.S. Patents discussed above, the polyarylates produced by the diacetate process described therein still tend to contain colored species to an unacceptable extent and tend to be melt unstable if the intermediate dihydric phenol diester is not carefully purified prior to polymerization. Thus, the polyarylate must be prepared from a highly purified intermediate dihydric phenol diester, or it is difficult to fabricate. Also without purification of the diester, the polyarylate may not be acceptable in applications where polyarylates which are low in color are required.

U.S. Pat. No. 4,321,355 issued Mar. 23, 1982 to Maresca, et al, describes an improved process for preparing a polyarylate via the diacetate process. The improvement comprises removal of residual acid anhydride to less than 1500 parts per million after formation of the dihydric phenol diester. The patent suggests removal of the residual acid anhydride by vacuum distillation, or by chemical reactants which are not harmful to the polymerization such as water, alcohols, dihydroxy compounds and the like. Further, the patent examples describe removal of both acid anhydride and acetic acid by vacuum distillation or the addition of Bisphenol A.

While vacuum distillation is effective for small batches, it is difficult to consistently obtain these results on large batches due to the need for high vacuum, which cannot be routinely achieved or which requires expensive equipment. It has now been discovered that the addition of a $C_2$–$C_8$ aliphatic monocarboxylic acid, preferably glacial acetic acid, achieves the necessary reduction of acid anhydride, and achieves a lower color polymer. As above stated, while it is possible in the laboratory to lower the residual acid anhydride concentration low enough to produce a stable, low color polymer by vacuum distillation alone, it has produced inconsistent results in production. Acetic anhydride levels varied from 1520 ppm to 13,000 ppm in production batches.

Various acids have been used in the prior art such as in esterification reactions as catalysts, but not in the context as shown herein. For example, in an article by Jose Erdos, et al. titled "Esterification of Phenol With Organic Anhydrides Using Chlorosulfonic Acid Catalysts" in Anales De La Escuela Nacional De Ciencias Biologicas, Vol. VIII, the esterification of phenols with organic anhydrides using acid catalysts is described. Specifically, the reaction of phenol with acetic anhydride in the presence of chlorosulfonic acid as catalyst is described. The catalyst is used in amounts of from 0.001 to 0.1 moles. The best yield of ester is stated to be when 0.001 mole of chlorosulfonic acid is used. This amount of the acid is equivalent to about 51 moles per million grams of reaction mixture.

The article further describes the use of concentrated sulfuric acid as a catalyst for the reaction of phenol and acetic anhydride. The sulfuric acid is used in amounts of from 0.0005 to 0.002 moles. The best yield (77.53%) of ester occurs when at least 0.001 mole of the acid is used. 0.001 mole of sulfuric acid in this system is equivalent to about 51 moles per million grams of reaction mixture.

In an article titled, "Acetic Anhydride-Phosphoric Acid as an Acetylating Agent", Carbohyd. Res., 6 (1968), pages 237–240 there is described that an acetic anhydride-phosphoric acid reagent is effective for acetylating carbohydrates, cyclitols, enols, phenols, etc. to produce acetates. The acetylating agent is used in amounts of from 10 to 25 milliliters to provide acetate in yields of from 55 to 92 percent.

M. V. Nekhoroshev, et al. in a publication titled, "Methods of Acylation of Sterically Hindered Phenols", Zhurnal Organicheskoi Khimii, Vol. 13, No. 3, page 662, March, 1977, describes the acylation of a phenol. Specifically, acetic anhydride is reacted with 4-alkyl-2,6-di-tert-butylphenol in the presence of perchloric acid as catalyst to yield (85–90 percent) the acetate. 1–2 drops of the perchloric acid catalyst are used. This is equivalent to about 200 moles per million grams of reaction mixture.

Additionally, in an article by M. Levine, et al. titled, "Properties of Polyesters of Bisphenols and Dicarboxylic Acids", Journal of Polymer Science, Vol. XXVIII, 5 1958, pages 179–184, the acetylation of bisphenol A is described. Specifically, bisphenol A is heated with acetic anhydride and 8 drops of sulfuric acid as catalyst to form the ester. The 8 drops of acid are equal to about 0.0075 moles which is equivalent to about 88 moles per million grams of reaction mixture.

It can thus be seen that the acylation of hydroxy-containing compounds with anhydrides has been catalyzed with large amounts of acid catalysts. The use of such large amounts of strong acids leads to handling problems as well as corrosion in the equipment used to prepare the ester.

It has now been unexpectedly found that residual acid anhydride can be most efficiently removed from the crude dihydric phenol diester reaction product by vacuum distillation followed by the addition of acetic acid, preferably glacial acetic acid (in order to minimize introduction of water), and followed by vacuum distillation. Since acetic acid is a byproduct of the reaction, it is not an additional contaminant and therefore does not require additional purification, and results in a polymer that is melt stable, and low in color. The residual acid anhydride is removed by vacuum distillation created by exerting 15 mm Hg pressure or less, then the addition of $C_2$–$C_8$ aliphatic monocarboxylic acid, preferably glacial acetic acid, to the monomer reaction and distilling acid anhydride and acetic acid so that the acid anhydride concentration is less than about 1500 parts per million. It has also been found that the addition of acetic acid during the polymerization stage in conjunction with mechanical obstruction apparatus minimizes escape of monomer reactants in the polymerization step and produces a more satisfactory color product.

DESCRIPTION OF THE INVENTION

This invention is directed to an improved process for preparing polyarylate polymers by the diacetate process. The polyarylate polymers produced by the process of this invention are melt stable and low in color. It has been found that such a polyarylate is produced when the residual acid anhydride is removed after the formation of the dihydric phenol diester and prior to its reaction with the aromatic dicarboxylic acid(s). The residual acid anhydride is removed by vacuum distillation followed by adding $C_2$–$C_8$ aliphatic monocarboxylic acid, preferably glacial acetic acid, a byproduct of the reaction, followed by vacuum distillation of acetic acid and acid anhydride so that its concentration is sufficient to enable a stable, low color polymer, typically less than about 1500 parts per million preferably less than about 1000 ppm.

It has been found that by removing the residual acid anhydride using acetic acid, the diester can be reacted directly with the aromatic dicarboxylic acid(s), without a further purification step, to produce polyarylates which are melt stable and low in color.

Described herein is a process for preparing a polyarylate having a reduced viscosity of from about 0.5 to greater than 1.0 dl/gm which process comprises the following steps:

(a) reacting an acid anhydride derived from an acid containing from 2 to 8 carbon atoms with at least one dihydric phenol to form the corresponding diester;

(b) after forming the diester, removing by vacuum distillation the bulk of the residual acid anhydride, then adding acetic acid, then vacuum distilling to bring the anhydride concentration to a level low enough to enable the formation of a polymer having a low color and good thermal stability; and (c) reacting said diester with at least one aromatic dicarboxylic acid at a temperature sufficient to form the polyarylate polymer; adding acetic acid to minimize loss of monomers comprising dicarboxylic acids and diester from the reaction; said polyarylate polymer is optionally formed in the presence of 0 wt. percent to 70 wt. percent diphenyl ether based on weight solids.

The acid anhydride suitable for use herein is derived from an aliphatic monocarboxylic acid containing from 2 to 8 carbon atoms. The preferred acid anhydride is acetic anhydride.

Any dihydric phenol well known to those skilled in the art may be used herein. Preferably, the dihydric phenol suitable for the use in this invention is of the following formula:

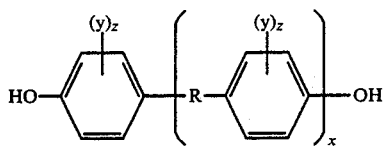

wherein y is independently selected from alkyl groups of 1 to 4 carbon atoms, chlorine or bromine, z independently has a value of from 0 to 4, inclusive, and R is independently selected from a divalent saturated aliphatic hydrocarbon radical, particularly alkylene or alkylidene radicals having from 1 to 8 carbon atoms, especially $C(CH_3)_2$, cycloalkylene or cycloalkylidene, and aryl radicals having up to and including 9 carbon atoms, a chemical bond, O, S, SO, $SO_2$, and CO, x is 0 or 1.

The dihydric phenols that may be used in this invention include the following:
2,2-bis-(4-hydroxyphenyl)propane,
bis-(2-hydroxyphenyl)methane,
bis-(4-hydroxyphenyl)methane,
bis-(4-hydroxyphenyl)phenyl methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)1,2-bis-(phenyl)-propane,
4,4'-(dihydroxyphenyl)ether
4,4'-(dihydroxyphenyl)sulfide,
4,4'-(dihydroxyphenyl)sulfone,
4,4'-(dihydroxyphenyl)sulfoxide,
4,4'-(dihydroxybenzophenone), hydroquinone, and naphthalene diols.

Generally, the dihydric phenol reacts with the acid anhydride under conventional esterification conditions to form the dihydric phenol diester. Acetic acid is formed as a byproduct. Additional acetic acid is added in order to remove residual acid anhydride and acetic acid.

The aromatic dicarboxylic acid(s) that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents such as halides, alkyl or aryl ethers, and the like. Preferably, mixtures of isophthalic and terephthalic acids are used. The isophthalic acid to terephthalic acid ratio in the mixture is about 20:80 to about 100:0, while the most preferred acid ratio is about 25:75 to about 75:25. Also, from about 0.5 to about 20 percent of at least one aliphatic diacid containing from 2 to about 10 carbon atoms, such as adipic acid, sebacic acid, and the like, or mixtures thereof, may be additionally used in the polymerization reaction.

The preparation of the polyarylate may be carried out in bulk, with or without solvent, preferably in the presence of from about 0 wt. percent to about 70 wt. percent, more preferably from about 30 wt. percent to about 65 wt. percent, and most preferably from about 40 wt. % to about 60 wt. % of an organic solvent (based on wt. solids).

The preferred organic solvents are a diphenyl ether compound as described in U.S. Pat. No. 4,294,956, supra, a cycloaliphatic substituted aromatic or heteroaromatic compound, as described in U.S. Pat. No. 4,294,957, supra, and a halogenated and/or etherated substituted aromatic or heteroaromatic compound.

The diphenyl ether compound may be substituted. These substituents are selected from alkyl groups, chlorine, bromine or any substituent which does not interfere with the polyarylate forming reaction or the reaction forming the diester derivative of the dihydric phenol. Additionally, the diphenyl ether compound may be used with up to 50 wt. percent of other compounds, such as various biphenyls or any other compounds which do not interfere with the polyarylate forming reaction or the reaction forming the diester derivative of the dihydric phenol.

The amount of said solvents could vary during the polymerization reaction. For example, it may be advantageous to increase progressively the amount of these solvents to maintain the reaction medium at constant viscosity.

A catalyst may be used to accelerate the rate of polyarylate formation. All the conventional catalysts capable of accelerating an ester exchange reaction are suitable for use herein. These include metal salts, generally erally the Group VII and VIII metal salts, such as magnesium, manganese or zinc salts. The salts are generally organic acid salts and include acetates, propionates, benzoates, oxalates, acetylacetonates, or mixtures thereof. A preferred catalyst is magnesium acetate. A catalytically effective amount is, for example, from about 1 to about 1000, preferably from about 10 to about 50, parts per million, based on the weight of the polyarylate produced.

The polyarylate polymer may be prepared in two reaction vessels by adding the acid anhydride and dihydric phenol to a reaction vessel and reacting these under esterification conditions described, supra to form the diester derivative of the dihydric phenol. Residual acid anhydride is then removed by vacuum distillation followed by adding acetic acid and vacuum distillation of acetic acid and acid anhydride. The residual acid anhydride is removed so that its concentration is less than about 1500, preferably less than about 1200, and most preferably less than about 1000 parts per million.

Specifically, the dihydric phenol diester is prepared by reacting a dihydric phenol with an acid anhydride at a temperature of from about 135° to about 150° C. for a period of from about 2 to about 4 hours and at a pressure sufficient to have the solvent refluxing at the reaction temperature. Generally, the reaction is carried out using an excess of about 15-25 mole percent acid anhydride in order to achieve a reasonable reaction rate and reasonable temperature. Under these conditions conversion to the dihydric phenol diester is at least about 99 percent.

Since the reaction proceeds most efficiently by utilizing excess acetic anhydride, residual anhydride must be removed. The residual is removed by distillation then the addition of acetic acid followed by vacuum distillation.

The polymerization process of this invention is carried out at a temperature of from about 260° to about 350° C. and preferably, from about 275° to about 295° C. The polymerization process is generally conducted in an inert atmosphere (such as argon or nitrogen) so that the oxygen content therein is minimized or eliminated. The oxygen content is generally less than about 100, preferably less than about 30, and most preferably less than about 10 parts per million. The process is preferably carried out at a pressure sufficient to have the diphenyl ether and acetic acid refluxing at the reaction temperature. This pressure is generally from about atmospheric to about 2 atmospheres. Lower and higher pressures may also be used. The monomer's partial pressure is reduced by the reduction in temperature caused by reflux of acetic acid and its addition back into the column. This method helps to maintain stoichiometric balance of reactants and particularly minimizes escape of terephthalic acid. Also, it is helpful to reduce the escape of monomers by physical obstruction means.

The polymerization is conducted for a period of time sufficient to produce a polyarylate having a reduced viscosity of at least about 0.5 to greater than 1.0 dl/gm, which time is generally less than about 10 hours, and generally in the range of from about 4 hours to about 8 hours, depending on the particular polyarylate being prepared.

The process of this invention produces novel polyarylates having a reduced viscosity of from about 0.5 to greater than about 1.0, preferably from about 0.6 to about 0.8 dl/gm, as measured in chloroform (0.5 g/dl chloroform) or other suitable solvent at 25° C. In those instances where the polyarylate is not soluble in chloroform, other solvents known in the art, such as parachlorophenol, phenol/tetrachloroethane (60:40), and the like, may be used. Reduced viscosities of the polyarylates measured in these solvents generally have the same range as those measured in chloroform.

The polyarylates may be prepared in the presence of materials such as molecular weight regulators, antioxidants, and the like.

The polyarylates obtained by the process of this invention may be used together with the well-known additives such as plasticizers, pigments, lubricating agents, mold release agents, stabilizers, inorganic fillers, and the like. These polyarylates may also be blended with one or more thermoplastic polymers.

EXAMPLES

The following examples serve to give specific illustrations of the practice of this invention but they are not intended in any way to limit the scope of this invention. Examples 1 & 2 and Control A show that if the acetic anhydride concentration in Bis A diacetate is reduced prior to polymerization, the product obtained is more stable.

CONTROL A

The reactor system consisted of a hot oil heated reactor fitted with a nitrogen inlet, mechanical agitator, and overhead column connected to an overhead take-off device.

The reactor was charged with 75.0 pounds of recrystallized bisphenol-A diacetate, 19.8 pounds of isophthalic acid, 19.8 pounds of terephthalic acid and 57.5 pounds of diphenyl ether. The reactor system was purged with nitrogen for about 20 minutes and then the heater turned on to raise the temperatures of the reactor to about 270° C. (the oil heater was set at about 300° C.). Acetic acid started to distill when the temperature of the mixture reached about 255° C. Acetic acid distillation was followed by measuring its level in the receiver. After about 3.5 hours at 270° C., the power draw on the agitator began to increase which indicated a viscosity increase. The reaction was terminated after 7.5 hours at reflux. The polymer was isolated by feeding the reaction product to an extruder and flashing off the solvent. The polymer had a reduced viscosity of 0.70 dl/g as measured in chloroform (0.50 gm/100 ml) at 25° C.

The melt stability of the polymer was measured in a Tinius Olsen thermodyne (melt flow cell) at 375° C. The polymer was added to the preheated (375° C.) chamber of the thermodyne and put under a constant pressure of 44 psi. After 10 and 30 minutes at 375° C., samples of the polymer were taken by allowing the polymer to flow freely from the bottom of the cavity. The reduced viscosity of these samples was measured in chloroform (0.50 gm/100 ml) at 25° C. and found to be 0.67 and 0.63 dl/g, respectively.

The data is summarized in Table I.

This Control shows that when pure (crystallized) bis-phenol-A diacetate is used to prepare the polyarylate, a stable polymer is obtained.

EXAMPLE 1

A. Preparation of Bisphenol-A Diacetate

Into a reactor was charged 880g of bisphenol-A and 1000g of acetic anhydride. The reaction was heated to about 135° C. and held at this temperature for about 4 hours. The reaction was vacuum distilled for partial removal of acetic anhydride. Analysis of the crude product showed that conversion to bisphenol-A diacetate was 99.9% complete. The material also contained some residual acetic anhydride (less than 600 ppm based on weight of bisphenol-A diacetate as measured by titration with morpholine as described in Siggia and Hana, "Quantitative Organic Analysis via Functional Groups", Fourth Edition, Wiley-Interscience, 1979, pages 231 to 235).

B. Polymerization

The crude bisphenol-A diacetate prepared in (A) was charged into a second reactor. Also, 319g of isophthalic acid, 319g of terephthalic acid and 918g of diphenyl ether were charged to the reactor. The reaction was conducted under the conditions of Control A.

The polyarylate polymer produced had a reduced viscosity of 0.79 dl/g as measured in chloroform (0.50 gm/100 ml) at 25° C.

The melt stability of the polymer was measured in a Tinius Olsen thermodyne by the procedure as described in Control A. The reduced viscosity of the samples after 10 and 30 minutes in the thermodyne was 0.75 and 0.71 dl/g, respectively (as measured in chloroform, 0.50 gm/100 ml at 25° C.).

The data is summarized in Table I.

EXAMPLE 2

The procedure of Example 1 was repeated without removing the excess acetic anhydride as was done in Example 1. The crude bisphenol-A diacetate contained 3000 ppm of residual acetic anhydride (as determined by the procedure described in Example 1).

The polymer produced had a reduced viscosity of 0.72 dl/g as measured in chloroform (0.50 gm/100 ml at 25° C.).

The melt stability of the polymer was measured in a Tinius Olsen thermodyne by the procedure as described in Example 1. The reduced viscosity of the samples after 10 and 30 minutes in the thermodyne was 0.66 and 0.58 dl/g, respectively (as measured in chloroform, 0.50 gm/100 ml at 25° C.).

The data is summarized in Table I.

TABLE I

| Example | $RV_0$ | $RV_{10}$ | $RV_{30}$ | $\frac{RV_{10}}{RV_0}$ | $\frac{RV_{30}}{RV_0}$ |
|---|---|---|---|---|---|
| Control A | 0.70 | 0.67 | 0.63 | 0.96 | 0.90 |
| 1 | 0.79 | 0.75 | 0.71 | 0.95 | 0.90 |
| 2 | 0.72 | 0.66 | 0.58 | 0.92 | 0.81 |

$RV_0$ = the reduced viscosity of the polyarylate as prepared. $RV_{10}$, $RV_{30}$ = the reduced viscosity of the polyarylate after 10 and 30 minutes in the thermodyne.

The data in Table I shows that without reducing the acetic anhydride concentration in bisphenol-A diacetate prior to the polymerization, the product obtained is less stable. Consequently, these materials exhibit larger drops in reduced viscosity after 10 and 30 minutes at 375° C.

EXAMPLES 3-6

The procedure of Example 1 was repeated except upscaling to large production size (20,000 lb polymer production) where it is difficult to achieve enough vacuum to distill acetic anhydride. Table II shows the amount in the monomer stage of residual acetic anhydride after vacuum distillation alone, then the addition of 20 wt. percent acetic acid followed by distillation and the resulting amount of residual acetic anhydride. Specifically, it is demonstrated that in large scale up operation in order to feasibly and economically remove acetic anhydride, it was unexpectedly found that the addition of acetic acid in the monomer reaction achieves this goal.

TABLE II

| Example | Acetic Anhydride Level After Vacuum Distillation Without Using Acetic Acid | Acetic Anhydride Level After Adding 20% Acetic Acid in the Monomer Reaction Followed by Vacuum Distillation |
|---|---|---|
| 3 | 4135 ppm | 957 ppm |
| 4 | 4544 | 777 |
| 5 | 2100 | 750 |
| 6 | 13,000 | 689 |

What is claimed is:

1. A process for preparing a polyarylate having a reduced viscosity of from about 0.5 to greater than 1.0 dl/gm as measured at 25° C. in a concentration of 0.50 gm polymer per 100 ml of chloroform which process comprises the following steps:
   (a) reacting an acid anhydride derived from an aliphatic monocarboxylic acid containing from 2 to 8 carbon atoms with at least one dihydric phenol to form the corresponding diester;
   (b) after forming the diester, removing by vacuum distillation the bulk of the residual acid anhydride, then adding acetic acid, then vacuum distilling to bring the anhydride concentration to a level low enough to enable the formation of a polymer having a low color and good thermal stability; and
   (c) reacting said diester with at least one aromatic dicarboxylic acid at a temperature sufficient to form the polyarylate.

2. The process as defined in claim 1 wherein after step (b) the residual acid anhydride has been removed to a concentration of less than about 1500 ppm.

3. The process as defined in claim 1 wherein after step (b) the residual acid anhydride has been removed to a concentration of less than about 1200 ppm.

4. The process as defined in claim 1 wherein after step (b) the residual acid anhydride has been removed to a concentration of less than about 1000 ppm.

5. A process as defined in claim 1, wherein the dihydric phenol is of the following formula:

$$HO - \left[ \underset{(y)_z}{\bigcirc} - R - \underset{(y)_z}{\bigcirc} \right]_x - OH$$

wherein y is independently selected from alkyl groups of 1 to 4 carbon atoms, chlorine or bromine, z independently has a value of from 0 to 4, inclusive, R is a bridging unit independently selected from the group consisting of O, S, SO, $SO_2$, CO, a divalent saturated hydrocarbon radical having 1 to 8 carbon atoms, a cycloalkylene, a cycloalkylidene, and an aryl radical; or R is a chemical bond.

6. A process as defined in claim 1 wherein the dihydric phenol comprises a bisphenol-A.

7. A process as defined in claim 1, wherein the aromatic dicarboxylic acid comprises isophthalic acid or terephthalic acid or mixtures thereof.

8. The process of claim 1, wherein said aromatic dicarboxylic acid comprises terephthalic acid, and in step (c) acetic acid is added to minimize loss of terephthalic acid vapor from the reaction.

9. A process as defined in claim 7 wherein the proportion of isophthalic acid to terephthalic acid in said mixture is about 20:80 to about 99:1.

10. A process as defined in claim 7, wherein the proportion of isophthalic to terephthalic acid in said mixture is about 25:75 to about 75:25.

11. A process as defined in claim 1, wherein the reaction in step (c) is carried out in the presence of a catalytically effective amount of a catalyst.

12. A process as defined in claim 1 wherein reacting said diester in step (c) is performed in the presence of an organic solvent.

13. A process as defined in claim 12, wherein the organic solvent is a diphenyl ether compound.

14. A process as defined in claim 13 wherein said diphenyl ether is present at 1.0 wt. percent to 70 wt. percent based on weight solids.

15. A process as defined in claim 13, wherein the diphenyl ether compound is present at 40 wt. percent to 60 wt. percent based on weight solids.

16. The process of claim 1 wherein the vacuum of step (b) is created by exerting 15 mm Hg or less pressure.

17. A process for preparing a polyarylate having a reduced viscosity of from about 0.5 to greater than 1.0 dl/gm as measured at 25° C. in a concentration of 0.5 gm polymer per 100 ml of chloroform which process comprises the following steps:
  (a) reacting an acid anhydride derived from an aliphatic monocarboxylic acid comprising acetic acid with at least one dihydric phenol comprising Bisphenol A to form the corresponding diester;
  (b) after forming the diester, removing by vacuum distillation the bulk of the residual acid anhydride, then adding acetic acid, then vacuum distilling to bring the anhydride concentration to a level low enough to enable the formation of polymer having a low color and good thermal stability; and
  (c) reacting said diester with at least one aromatic dicarboxylic acid at a temperature sufficient to form the polyarylate; adding acetic acid to minimize loss of monomers comprising dicarboxylic acids and diester from the reaction; said polyarylate polymer is optionally formed in the presence of 1.0 wt. percent to 70 wt. percent diphenyl ether based on weight solids.

18. A process for preparing a polyarylate having a reduced viscosity of from about 0.5 to greater than 1.0 dl/gm as measured at 25° C. in a concentration of 0.50 gm polymer per 100 ml of chloroform which process comprises the following steps:
  (a) reacting an acid anhydride derived from an aliphatic monocarboxylic acid comprising acetic acid with at least one dihydric phenol comprising Bisphenol A to form the corresponding diester;
  (b) after forming the diester, removing by vacuum distillation the bulk of the residual acid anhydride, then adding acetic acid, then vacuum distilling to bring the anhydride concentration to a level low enough to enable the formation of a polymer having a low color and good thermal stability; and
  (c) reacting said diester with at least one aromatic dicarboxylic acid at a temperature sufficient to form the polyarylate; adding acetic acid to minimize loss of monomers comprising dicarboxylic acids and diester from the reaction; said polyarylate polymer is optionally formed in the presence of 1.0 wt. percent to 70 wt. percent diphenyl ether based on weight solids.

* * * * *